May 30, 1944.  H. V. NEWELL  2,350,247
MACHINERY GUARD
Filed July 12, 1943
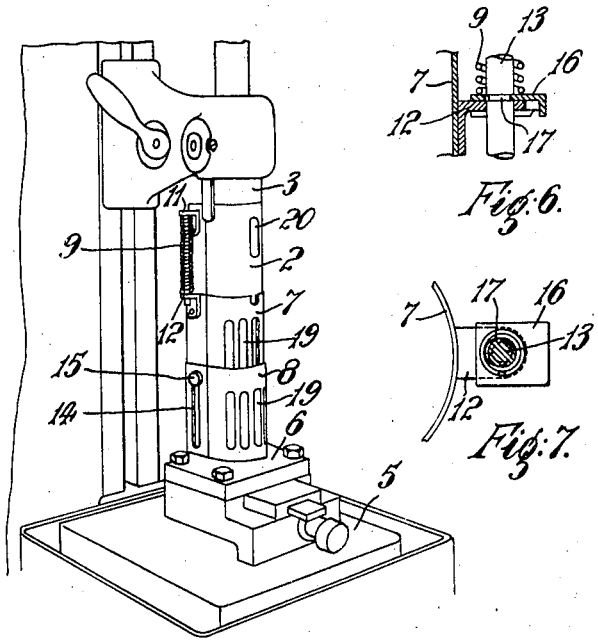
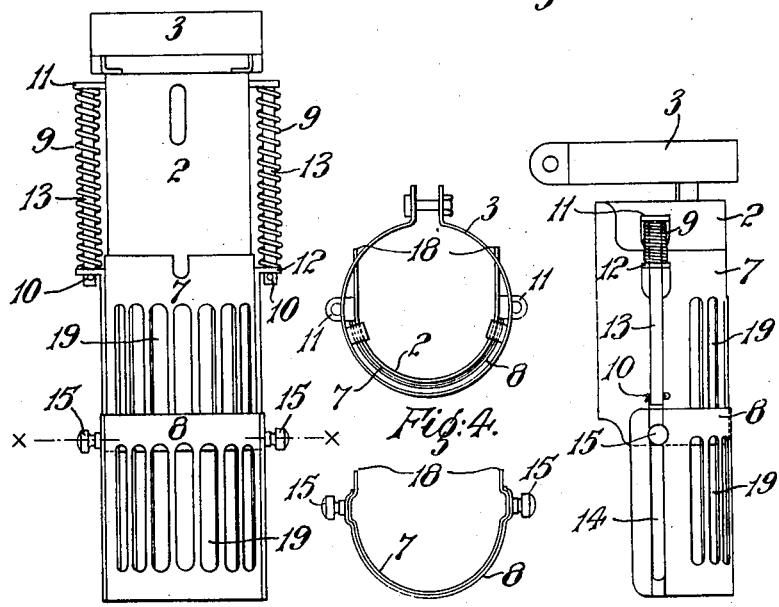
Inventor
Harold V. Newell
By Babcock & Babcock
Attorneys Patented May 30, 1944

UNITED STATES PATENT OFFICE 2,350,247

2,350,247

MACHINERY GUARD

Harold Vincent Newell, Coventry, England, assignor of one-fourth to Arthur Morris, one-fourth to George Enoch Smith, and one-fourth to Frank Allen Logan, all of Coventry, England Application July 12, 1943, Serial No. 494,397
In Great Britain November 13, 1942

1 Claim. (Cl. 74—612)

This invention relates to a guard for use in protecting machine operators from accidental injury, and more particularly for use in cases where there is relative reciprocatory movement between the tool and the work-piece.

With this object in view the invention consists in the provision of a machinery guard comprising a member which encloses and moves with the tool, and a stationary member which encloses the work-piece, said members having a telescopic engagement with each other. During the machining operation the movable member has a sliding engagement with the stationary member against the action of resilient means normally retaining the stationary member in its operative position with respect to the work-piece.

In the accompanying drawing,

Figure 1 is a general view illustrating the improved guard in position of use on a drilling machine.

Figure 2 is a front view of the guard in its fully extended state and on a larger scale.

Figure 3 is a side view of the guard in its fully contracted state.

Figure 4 is a plan of the guard.

Figure 5 is a cross-sectional view thereof on the line x—x of Figure 2.

Figure 6 is an enlarged detail view of the locking catch.

Figure 7 is a plan view thereof.

According to the specific construction shown in the drawing, as applied to drilling and like machines, one member 2 of the guard is detachably secured by means of a clip 3 attached thereto, to the reciprocating drill head so as to enclose and move with the drill during its movement into and out of engagement with a work-piece mounted on the table 5 of the machine, or on a jig or fixture 6 carried thereby. The other member of the guard, which is preferably made in two telescopic parts 7, 8 is held in contact with and about the work-piece or with the said jig or fixture, as the case may be, by means of compression springs 9 arranged between abutments 11, 12 on the members 2 and 7 respectively of the guard, the relative movement of the latter being guided by rods 13 secured to the abutments 11 on the top member 2 and sliding through holes in the abutments 12 on the part 7 of the bottom member of the guard. In this way the operator is at all times protected from contact with the rotating and reciprocating drill.

The object of making the relatively stationary member of the guard in two parts 7, 8 is to provide for drills of different lengths. For this purpose the part 8 is formed with guide slots 14 and the part 7 provided with screws 15 in sliding engagement with said slots. The two parts can be locked together by tightening the screws 15.

Relative movement between the members 2 and 8 of the guard is limited by means of stops, such as the cottar pins 10 at the free ends of the guide rods 13. When the drilling operation is completed the complete guard can be raised clear of the work-piece by raising the drill head a distance beyond the working stroke of the drill, the guard in this case being in its fully extended state as shown in Figure 2 with the cottar pins abutting against the under side of the bottom lugs 12. For the same purpose, as shown in Figures 6 and 7, there may be associated with one of the abutments 12 a catch plate 16 adapted, when the bottom member of the guard is raised by the operator against the action of the springs 9, to engage a groove 17 in the adjacent guide rod 13 to retain said bottom member in the raised position shown in Figure 3. In order to facilitate access to the tool or to the work-piece, the guard, as shown in Figures 4 and 5 is preferably made of a deep channel section with the open side 18 facing away from the operator. For the purposes of inspection the front of the guard may be formed with a series of slots 19 so that the progress of the machining operation may be safely watched. The upper part of the guard may also be provided at the front with a slot 20 to facilitate removal of the drill from the usual chuck by means of a drift tool.

A similar type of guard may be employed with advantage in connection with fly and power presses in which case one member of the telescopic guard will be attached to or engaged with the head carrying the punch so as to enclose the latter during the whole of its stroke whilst the other member of the guard will be held against the table by the spring or springs so as at all times to enclose the die.

A guard of the kind herein referred to can also be used with like advantages and in a similar manner in connection with turning, boring, shaping and milling machines.

In every case the actual machining operation is carried out within the guard and even when the tool is withdrawn from the work-piece they are both still enclosed by the guard, so that the operator is at all times fully protected from accidental injury.

I claim:

A guard for machines having a reciprocating tool and a stationary work-piece, comprising a longitudinally adjustable channel-section member adapted to enclose the work-piece and having inspection slots, a second channel-section member adapted to enclose the tool and having a clip for attachment to a head carrying said tool, said second channel-section member having a telescopic engagement with said first member, and springs arranged between said members and adapted to hold the first member stationary during movement of the second member.

HAROLD VINCENT NEWELL.